(12) United States Patent
Mosebach et al.

(10) Patent No.: US 6,425,773 B2
(45) Date of Patent: Jul. 30, 2002

(54) ELECTRICAL OUTLET WITH PROTECTIVE COVER

(75) Inventors: Dieter Mosebach, Mittelnkirchen; Jens Brey, Stade-Buetzfleth; Hans-Juergen Krick, Hamburg, all of (DE)

(73) Assignee: KID-Systeme GmbH, Buxtehude (DE)

( * ) Notice: Subject to any disclaimer, the term of this patent is extended or adjusted under 35 U.S.C. 154(b) by 0 days.

(21) Appl. No.: 09/815,956

(22) Filed: Mar. 23, 2001

(30) Foreign Application Priority Data

Mar. 23, 2000 (DE) ......................................... 100 14 500

(51) Int. Cl.⁷ ............................................... H01R 13/44
(52) U.S. Cl. ........................ 439/137; 439/142; 439/136; 439/139; 439/139 F
(58) Field of Search ................................. 439/137, 139, 439/145, 136, 142, 138

(56) References Cited

FOREIGN PATENT DOCUMENTS

| AU | 0271745 | * | 2/1966 | ................. 439/136 |
| CH | 0489927 | * | 6/1970 | ............. 439/139 F |
| DE | 2109720 | * | 10/1971 | ................. 439/139 |
| DE | 2918784 | * | 4/1981 | ................. 439/142 |
| DE | G9211368 | | 12/1992 | |
| EP | 0539093 | | 4/1993 | |
| EP | 0646990 | | 4/1995 | |
| EP | 0763875 | | 3/1997 | |
| FR | 2619966 | * | 3/1989 | ................. 439/142 |
| GB | 612486 | | 1/1947 | |
| GB | 1180816 | * | 2/1970 | ................. 439/142 |

* cited by examiner

Primary Examiner—P. Austin Bradley
Assistant Examiner—Larisa Tsukerman
(74) Attorney, Agent, or Firm—W. F. Fasse; W. G. Fasse

(57) ABSTRACT

An electrical outlet has socket openings for insertion of contact pins of an electrical plug therein, a closure element that selectively closes or opens the socket openings, and a latching element that selectively latches or unlatches the closure element. The closure element slides perpendicularly to the insertion axis. The latching element includes a latching pawl that is flexibly deflectable parallel to the insertion axis, between a latched position for engaging the closure element and an unlatched position for releasing the closure element. An unlatching pin of an adapter is inserted to deflect the latching pawl to disengage it from the closure element. This unlocks the receptacle for use. Then the contact pins of the plug may be inserted through holes in the adapter and into the socket openings to press sloping surfaces of the closure element to slide the closure element to the open position.

18 Claims, 7 Drawing Sheets

ELECTRICAL OUTLET WITH PROTECTIVE COVER

PRIORITY CLAIM

This application is based on and claims the priority under 35 U.S.C. §119 of German Patent Application 100 14 500.0, filed on Mar. 23, 2000, the entire disclosure of which is incorporated herein by reference.

FIELD OF THE INVENTION

The invention relates to an electrical outlet or receptacle with a protective cover that is slidable to selectively cover or uncover the electrical contact socket openings of the electrical outlet, into which the electrical contact pins of a mating electrical plug may be inserted for establishing an electrical connection. This electrical outlet is particularly suitable for use in an aircraft, and is to be arranged close to a passenger seat in an aircraft, for providing electrical power to portable electrical and electronic devices such as laptop computers, compact disk and cassette tape players, and the like.

BACKGROUND INFORMATION

Due to the ever expanding availability and use of portable electrical and electronic devices, such as laptop computers, compact disk players, cassette tape players, and the like, there has been an increasing demand by passengers to also use such devices during flight in an aircraft. Since the battery or accumulator capacity of such devices is not sufficient for powering the devices during longer flight durations, there is further a demand for electrical outlets arranged in or near passenger seats in an aircraft, in order to provide electrical power for powering such passenger convenience devices. However, in view of the dangers of electromagnetic interference in an aircraft and for various other reasons, it is not possible, i.e. it is not allowed, for passengers to operate any desired electrical or electronic device.

In order to control the types of electronic devices that may be plugged into electrical outlets provided for passenger use in the aircraft, regulations specify the type or functional features of electrical outlets that may be provided in an aircraft. In this context, an electrical outlet is required, into which typical commercially available electrical plugs will not fit without a special adapter. This prevents a passenger from plugging an electrical device into the electrical outlet unless the passenger has been provided with the special adapter. Such an adapter must fulfill the following requirements. The adapter must provide the possibility of connecting to a hypertronic electrical outlet with a 15 volt d.c. outlet voltage. Also, the adapter must be able to deliver or derive the necessary supply voltage required by a laptop computer or the like, from the 15 volt d.c. voltage that is available from the outlet. Also, the adapter must provide the specific configuration of the electrical contact socket openings to mate with the respective electrical plug of the laptop computer or the like.

It is a disadvantage of using such adapters, that it becomes necessary to constantly develop and provide new adapters for aircraft applications, necessitated by the rather rapid changing of models and electrical connection requirements of various electrical and electronic devices such as laptop computers and the like. As a result, it becomes an ongoing burden to provide updated adapters. Moreover, the availability of a suitable adapter is not always ensured, so that a passenger will not necessarily be able to use the intended electrical or electronic device in the aircraft. A further disadvantage is that the necessary adapters are not provided by the manufacturers of the laptop computers or other devices, so that a suitable compatibility between the laptop computer or other device and the aircraft electrical outlets is not always ensured.

It is also generally known in the art to provide an electrical outlet with a protective cover that selectively closes or opens the electrical contact socket openings, so as to selectively allow or prevent the contact pins of an electrical plug to be inserted into the socket openings of the electrical outlet. Generally, such a protective cover is slidable in a direction perpendicular to the axis of the electrical outlet, and includes a sloping surface or the like, so that the contact pins of an electrical plug being inserted into the socket openings will cause the protective cover to be pushed slidingly aside, so as to allow the contact pins to be inserted into the socket openings and thereby establish an electrical connection. Such an electrical outlet may further include a locking or latching mechanism that selectively prevents the protective cover from being pushed slidingly out of its position covering the socket openings. Special measures must be carried out in order to unlatch the latching mechanism.

More particularly, a variety of different electrical outlet configurations or structures have become known in this context. For example, published British Patent Specification GB 612,486 discloses an electrical outlet that includes a protective mechanism for covering the electrical contact socket openings thereof, in the form of two flat insulating plates. These insulating plates are generally urged and held into a rest position by one or two compression springs, particularly by the influence of the springs respectively pressing against a protrusion of each respective insulating plate. In this resting position, the insulating plates are in a pivoted position in which they are blocked from sliding in a direction necessary for uncovering the socket openings. By inserting the ground contact pin of an electrical plug into a corresponding opening of the electrical outlet, this grounding contact pin of the plug causes the insulating plates to pivot into an unlocked or unblocked position. Then, as the electrical plug is inserted further into the electrical outlet, the conductor pins being inserted into the corresponding socket openings cause the insulating plates to slide into a further position in which they open or uncover the corresponding socket contacts of the electrical outlet.

Published European Patent Application EP 0,539,093 discloses an electrical outlet with two contacts for connecting with the pin contacts of an electrical plug. The electrical outlet includes a shutter element which covers two socket openings provided in the front face wall of the electrical outlet, when this shutter element is in a closed position. Also, the shutter element is latched in this closed position, i.e. is prevented from sliding out of the closed position into an open position in which the socket openings are uncovered. The shutter element is unlatched by the insertion of the ground contact pin or a protrusion of the electrical plug. Particularly, the ground contact pin spreads apart two latching legs of the shutter element, so as to disengage these latching legs from a fixed latching element. Then, the insertion of the electrical contact pins of the electrical plug into the corresponding socket openings of the electrical outlet causes the shutter element to slide out of the way, to allow the contact pins to enter into the socket contacts of the electrical outlet in order to establish the electrical connection therebetween.

German Utility Model DE 92 11 368 U1 discloses a safety contact plug connector or electrical outlet including an electrical plug and a housing that is closeable or coverable by a cap. The housing includes a base body made of an electrically insulating material, with shielding contacts as well as two contact sleeves or sockets for respectively receiving the contact pins of a profiled electrical plug. The plug can be inserted into an appropriately formed recess of the cap. The floor of this recess is provided with holes through which the contact pins of the plug are inserted. An essentially T-shaped blocking element is rotatably arranged between the floor of this recess and the free ends of the contact sleeves in the housing. The T-shaped blocking element is biased by a spring to rotate into a blocking position. A flange of the blocking element protrudes into the space between the two holes in the floor of the recess and the free ends of the contact sleeves. An unlatching pin is arranged on the electrical plug. When the plug is inserted into the recess, this unlatching pin passes through an unlatching hole in the floor of the recess and then bears on or acts on an adjusting surface on a web of the blocking element. Thereby, the blocking element is moved or particularly rotated against the pre-biasing spring forces, and the flange of the blocking element uncovers the space between the floor of the recess and the free ends of the contact sleeves, so that the contact pins of the plug can be inserted into the contact sleeves.

Published European Patent Publication EP 0,763,875 A1 discloses an electrical plug connection including an electrical plug and an electrical outlet. The openings of the plug contact sockets are usually covered by a surfacially extending or plate-shaped closure element that is slidably arranged in the housing of the electrical outlet. An adapter fitted onto the electrical plug serves to move the closure element so as to open the socket openings for the purpose of inserting the contact pins of the electrical plug into the plug contact sockets of the electrical outlet. For this purpose, the adapter includes an unlocking or unlatching pin, which cooperates with the slidable closure element upon inserting the plug into the outlet, in order to achieve a sliding displacement of the closure element and thereby to uncover or open the socket openings of the contact sockets. Particularly, the unlatching pin of the adapter presses down on a flexible latch member of the closure element, so as to be moved clear of a fixed latching element, and thereby allow the closure element to be slidingly displaced by the contact pins of the plug being inserted into the corresponding socket openings. Thereby, it becomes possible to insert the pin contacts of the electrical plug into the socket contacts of the electrical outlet so as to establish the electrical connection therebetween.

Published European Patent Application EP 0,646,990 A1 discloses an electrical outlet that includes a closure element that selectively covers the socket openings of the socket contacts. Upon insertion of an electrical plug into the electrical outlet, the closure element is slidable in a direction perpendicular to the axis of the electrical outlet, and particularly in a prescribed direction, so as to selectively open or uncover the socket openings. The closure element is biased to slide into the closed position by the spring force of a compression spring. The closure element is usually also locked or latched into this closed position. An adapter is provided on the electrical plug, whereby the adapter has two unlatching pins that are inserted into corresponding holes in the housing, in order to unlatch the closure element. In this arrangement, it is disadvantageous, that the adapter must be arranged onto the electrical plug each time before being able to establish the electrical connection, i.e. before being able to insert the electrical plug into the electrical outlet. Also, the adapter must be exactly properly positioned on the electrical plug in order that the unlatching pins will be properly guided into the corresponding openings for the purpose of unlatching the closure element, while the contact pins are inserted into the socket openings. Also the latching mechanism is rather complex.

SUMMARY OF THE INVENTION

In view of the above it is an object of the invention to provide a safety electrical outlet including a protective cover of the above described general type, which is especially configured so that an electronic or electrical device can be easily plugged into the electrical outlet using the standard power cable and associated electrical plug prescribed by the manufacturer of the device, without requiring any special complicated measures. Particularly, the inventive electrical outlet shall accept a standard electrical plug without requiring an adapter mounted on the electrical plug. The invention further aims to avoid or overcome the disadvantages of the prior art, and to achieve additional advantages, as apparent from the present specification.

The above objects have been achieved according to the invention in an electrical outlet including a housing that comprises a receptacle housing having socket openings therein, and a housing block with socket contacts therein, whereby the contact pins of an electrical plug may be inserted through the socket openings to engage into and make contact with the socket contacts. The electrical outlet further includes a closure element slidably arranged in the housing block so as to be slidable substantially perpendicularly to the insertion axis between a first position in which it covers or closes the socket openings (or rather blocks respective insertion paths extending from the socket openings to the socket contacts), and a second position in which it uncovers or opens the socket openings. The closure element includes sloping surfaces, which are pressed against by the contact pins of the electrical plug as the plug is inserted, so that the sloping surfaces cause a lateral force to be applied to the closure element, causing the closure element to slide from the closed position to the open position.

Further according to the invention, a mechanism is provided for latching the closure element in the closed position, to prevent the closure element from sliding into the open position. The latching mechanism includes a latching element comprising a latching pawl connected to a mounting element by a connector web. The latching element, or at least the latching pawl thereof, is displaceable in a direction substantially parallel to the plug insertion axis of the electrical outlet. The latching pawl is ordinarily urged by a spring into a latching position, in which the latching pawl engages the closure element so as to prevent the closure element from sliding from the closed position into the open position. By displacing the latching pawl in a direction against the spring bias force substantially parallel to the insertion axis, the latching pawl is disengaged from the closure element so that the closure element can slidingly move from the closed position into the open position.

The entire latching element may be slidably received in the housing block, so that the entire latching element may slide parallel to the insertion axis for latching or unlatching the closure element. However, preferably, the mounting element of the latching element is fixed in the housing block, e.g. press-fit into a groove extending parallel to the insertion axis in the housing block, and the connector web and/or the latching pawl are elastically flexible, so that the latching pawl may be flexibly deflected in a direction parallel to the insertion axis, for selectively latching or unlatching the closure element.

The inventive arrangement or combination preferably further includes an adapter that is fitted on the electrical outlet. Particularly, the adapter includes an adapter body that is pressed against the floor surface of the receptacle recess of the electrical outlet, as well as an unlatching pin that protrudes from the adapter body and is inserted into the electrical outlet housing so as to exert an axial force against the latching element and particularly the connector web or the latching pawl thereof in a direction parallel to the insertion axis. In this manner, the adapter and particularly the unlatching pin thereof displaces the latching pawl in the insertion axis direction so as to disengage the latching pawl from the closure element. Then, when the contact pins of an ordinary electrical plug are inserted through corresponding holes in the adapter and into the socket openings of the electrical outlet, the contact pins will press against the sloping surfaces of the closure element and cause the closure element to slide from the closed position into the open position. Then, further insertion of the contact pins of the electrical plug will bring the contact pins into electrically contacting engagement with the socket contacts.

According to further particular details of the invention, the closure element includes an elongated guide body and two closure arms or legs arranged laterally and longitudinally relative to the elongated guide body. The sloping surfaces are respectively provided on the closure arms. The elongated guide body is slidingly received in a groove in the housing block or the receptacle housing and is, for example, biased into the closed position by a compression spring. The elongated guide body further includes a latch recess, latch opening or latch protrusion that is configured and adapted to be engaged by the latching pawl of the latching element.

Alternatively, the closure element and the latching element may have any respective configurations that achieve the general features of the invention.

An advantage of the invention is that the electrical outlet remains "locked", i.e. an electrical plug cannot be inserted in the electrical outlet, unless the adapter has been inserted into the electrical outlet. Thus, the adapter essentially serves the function of a key that unlocks the electrical outlet to make it available for use. Once the adapter has been inserted into the electrical outlet, then a conventional electrical plug can be inserted into the electrical outlet, whereby the contact pins thereof cause the closure element to be slidingly moved from the closed position to the open position, so that the contact pins can be further inserted to make a contact connection with the socket contact elements of the electrical outlet. The closure element prevents accidental or passing insertion of other items into the electrical outlet, even if the adapter has been inserted to "unlock" the outlet.

Since the adapter is allocated to and inserted in the electrical outlet (rather than being mounted on the electrical plug), this combination of the adapter and the electrical outlet ensures that an electrical plug can be plugged into the electrical outlet in a routine manner, without requiring special measures to be taken by the passenger or other user of the electronic or electrical device that is to be plugged in. Particularly, there is no need for the user of the device to first attach an adapter onto the electrical plug of his electrical or electronic device. To the user, the arrangement of the adapter on the electrical outlet is essentially "transparent" and not troublesome or conspicuous, and the user must simply plug his electrical plug into the electrical sockets in the ordinary manner.

A further advantage of the inventive arrangement is that it achieves the intended purposes with a rather simple structural arrangement of simple components, which carry out their functions directly by sliding and/or deflecting, and without requiring complicated pivoting or compound motions.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED
EXAMPLE EMBODIMENTS AND OF THE
BEST MODE OF THE INVENTION

Figure 1:
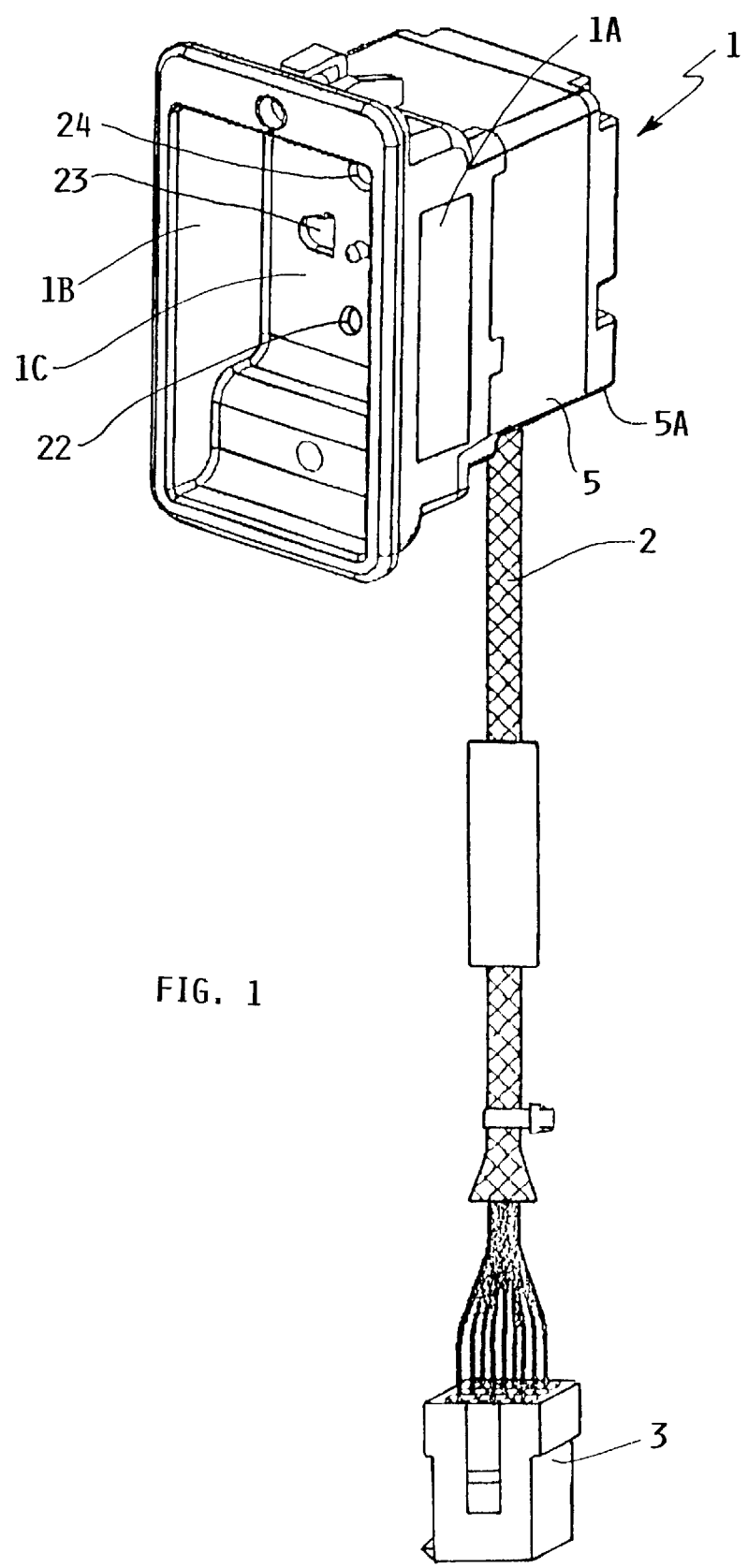
FIG. 1 is a perspective view of an electrical outlet according to the invention, with a connected electrical supply cable, which is suitable for installation on or adjacent to an aircraft passenger seat.

FIG. 1 shows an electrical outlet 1 according to the invention in perspective. The electrical outlet 1 comprises a housing that includes a receptacle housing 1A defining a receptacle recess 1B therein, a main housing block 5, and a housing backplate 5A, which are assembled to each other with screws or the like. The bottom or back of the receptacle recess 1B is bounded by a floor surface 1C, in which typical contact socket openings 23 and a ground socket opening 24, as well as an unlatching pin hole 22 are provided. These openings 23 and 24 and the hole 22 allow access into the interior of the electrical outlet 1. Namely, a conventional electrical plug can be inserted with its pins into the openings 23 and 24, and a special adapter according to the invention can be inserted into the hole 22, as will be described in greater detail below. This conventional electrical plug (not shown) is, for example, provided on the end of an electrical power cord leading to a conventional electrical or electronic device, such as a laptop computer, a cassette tape player, or the like. To provide the electrical power required by this device, the electrical outlet 1 is installed in the direct vicinity of a passenger seat in an aircraft, and is connected by an electrical supply cable 2 and a connector 3 to an onboard electrical supply net of the aircraft.

Figure 2A:
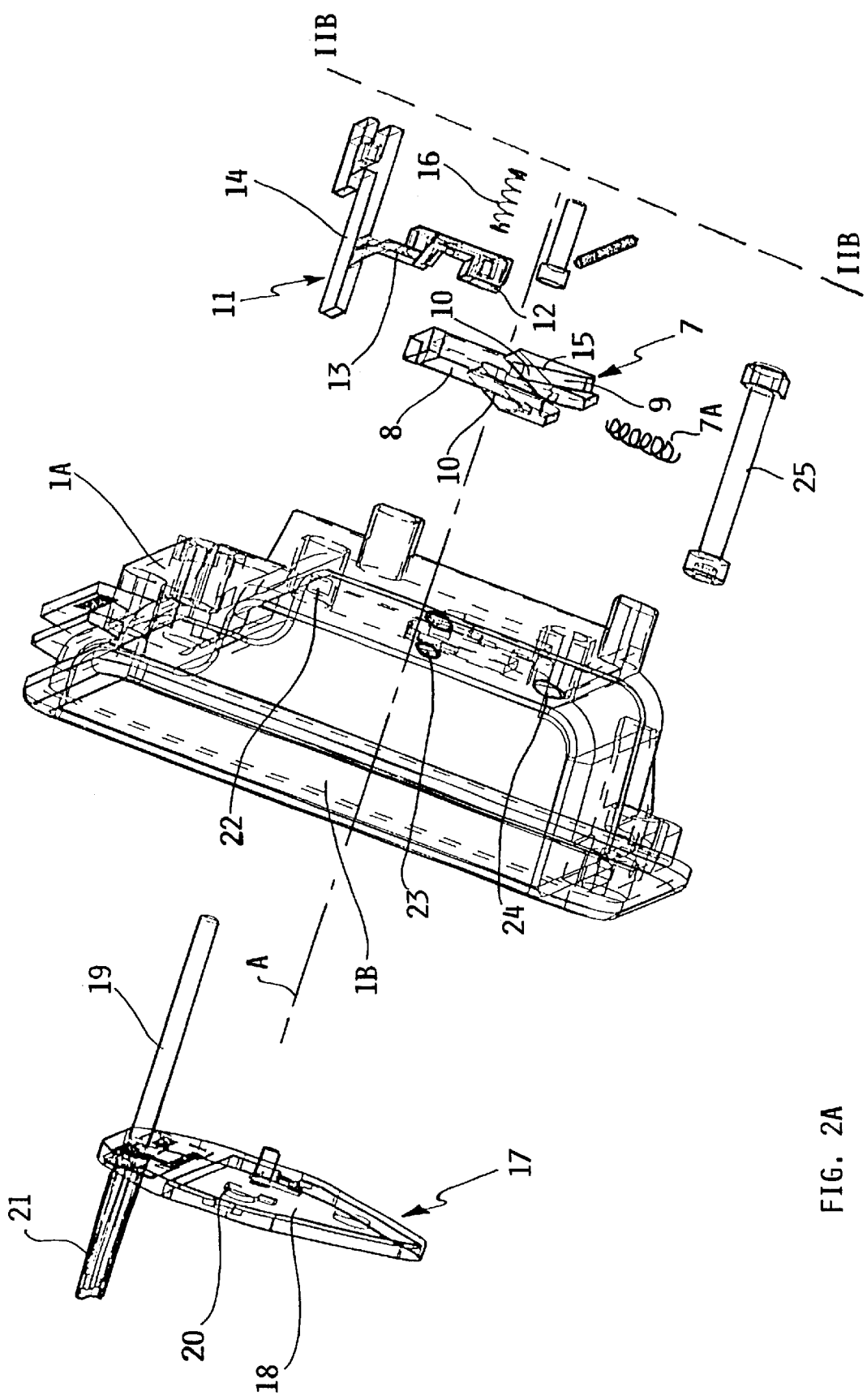
FIGS. 2A and 2B are each partial views of an exploded view of the electrical outlet according to the invention.
Figure 2B:
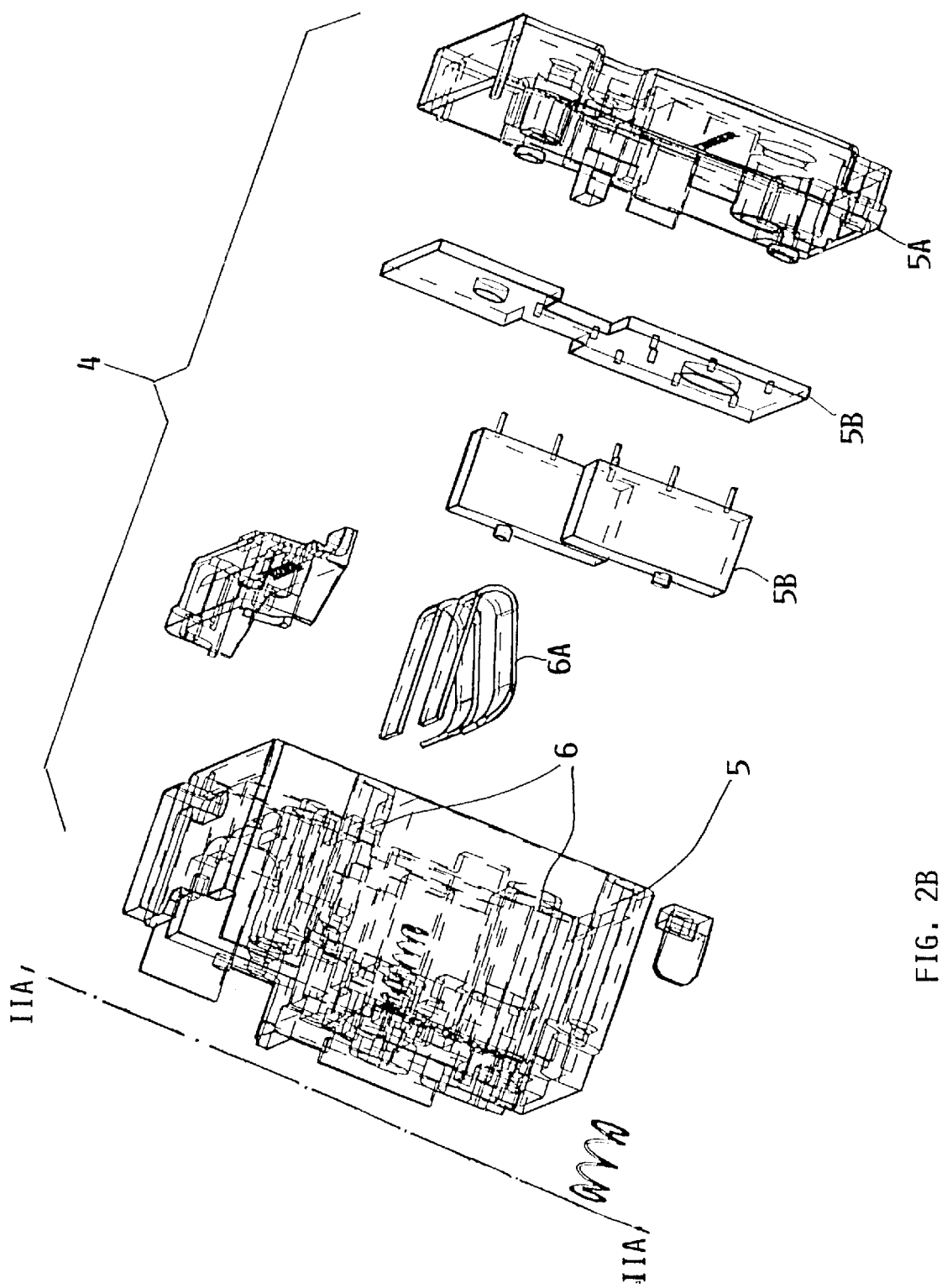
Figure 3A:
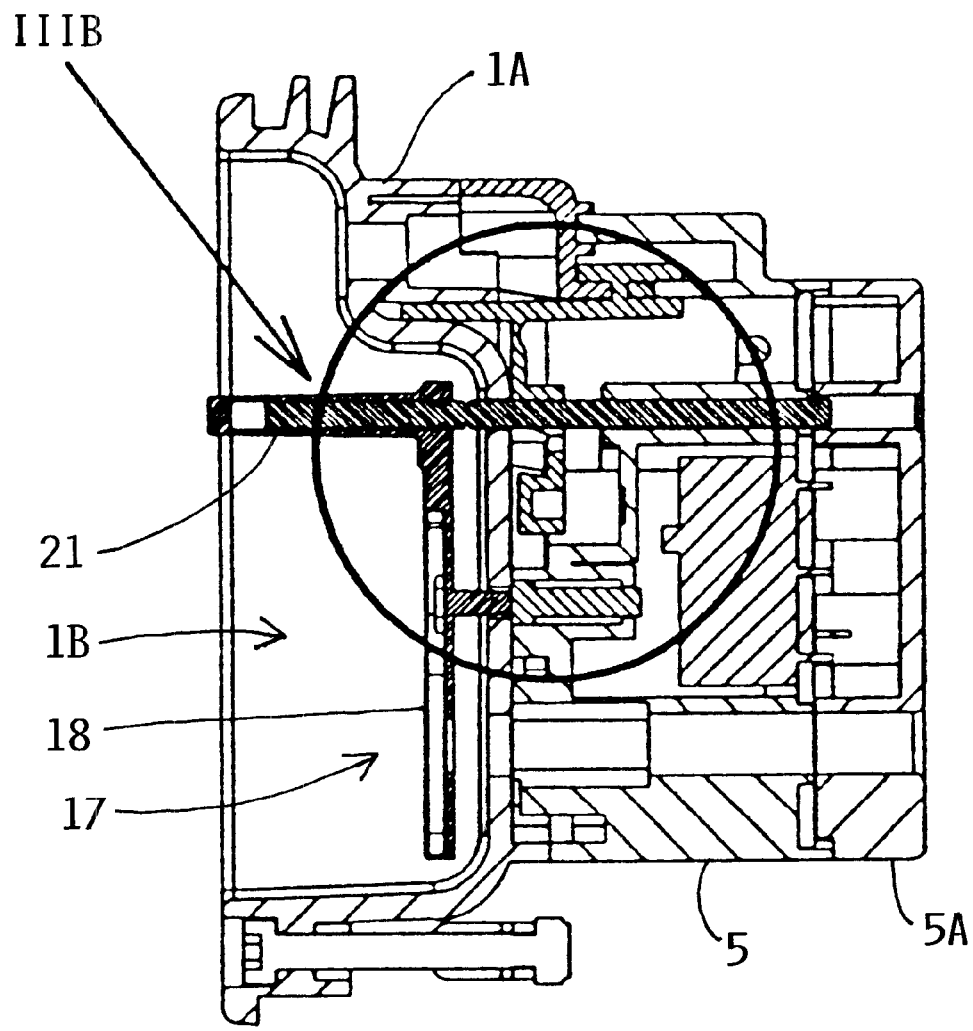
FIG. 3A is a sectional view of the components of FIGS. 2A and 2B in the assembled condition, wherein a safety adapter has been partially inserted, but not yet far enough to unlatch the latching element from the closure element.
Figure 3B:
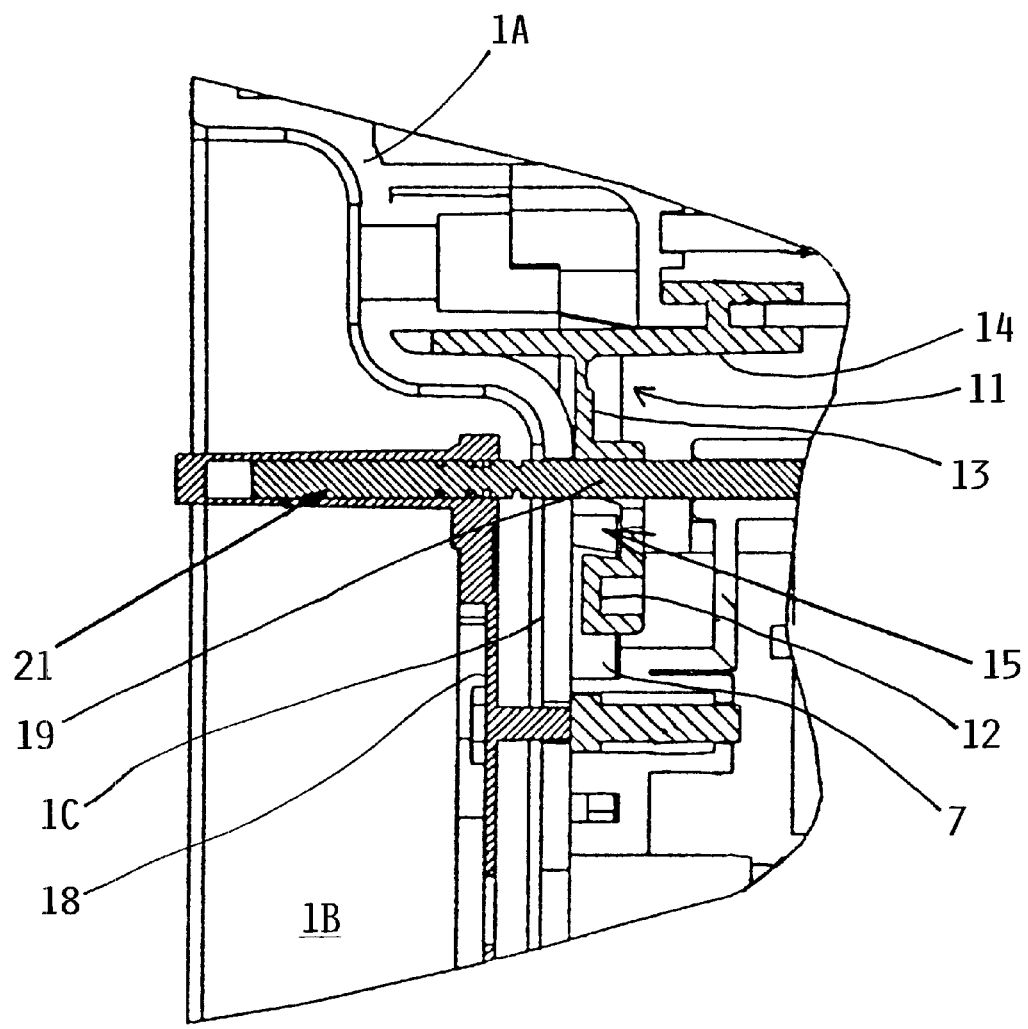
FIG. 3B is an enlarged detail view of the detail portion IIIB of FIG. 3A.
Figure 4A:
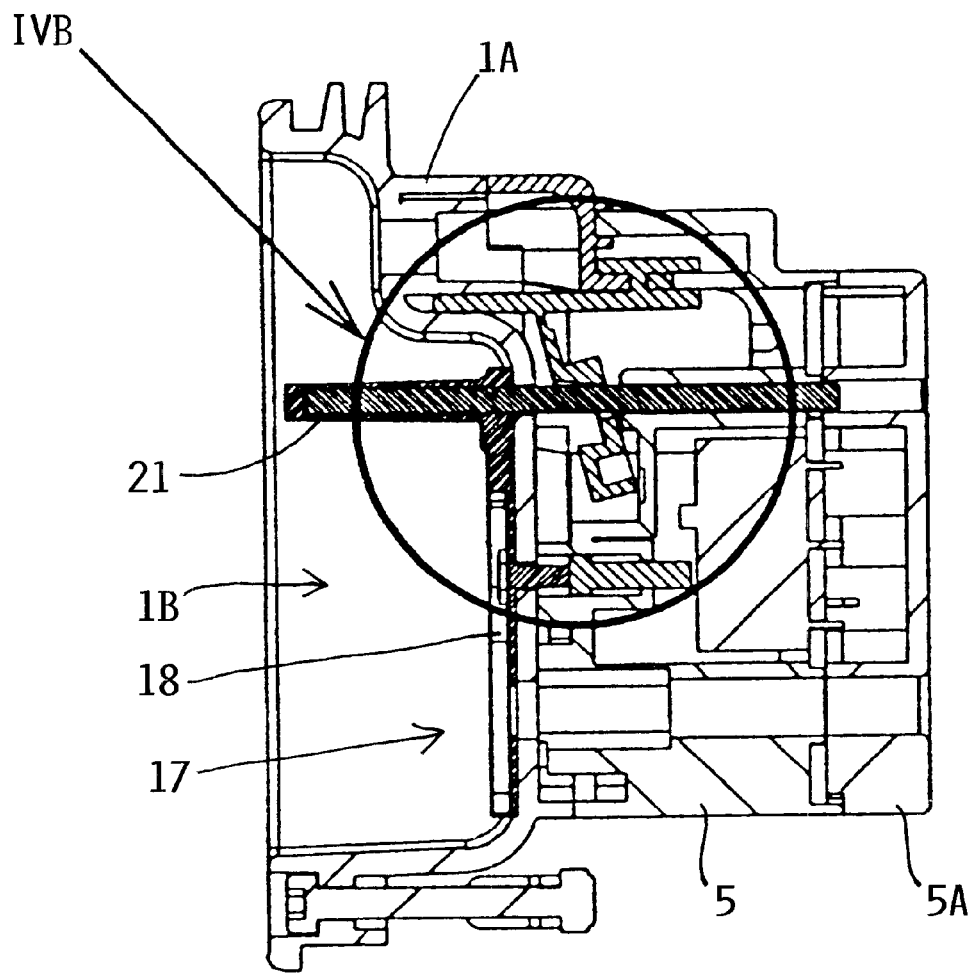
FIG. 4A is a sectional view similar to FIG. 3A, but showing the safety adapter fully inserted to unlatch the latching element from the closure element.
Figure 4B:
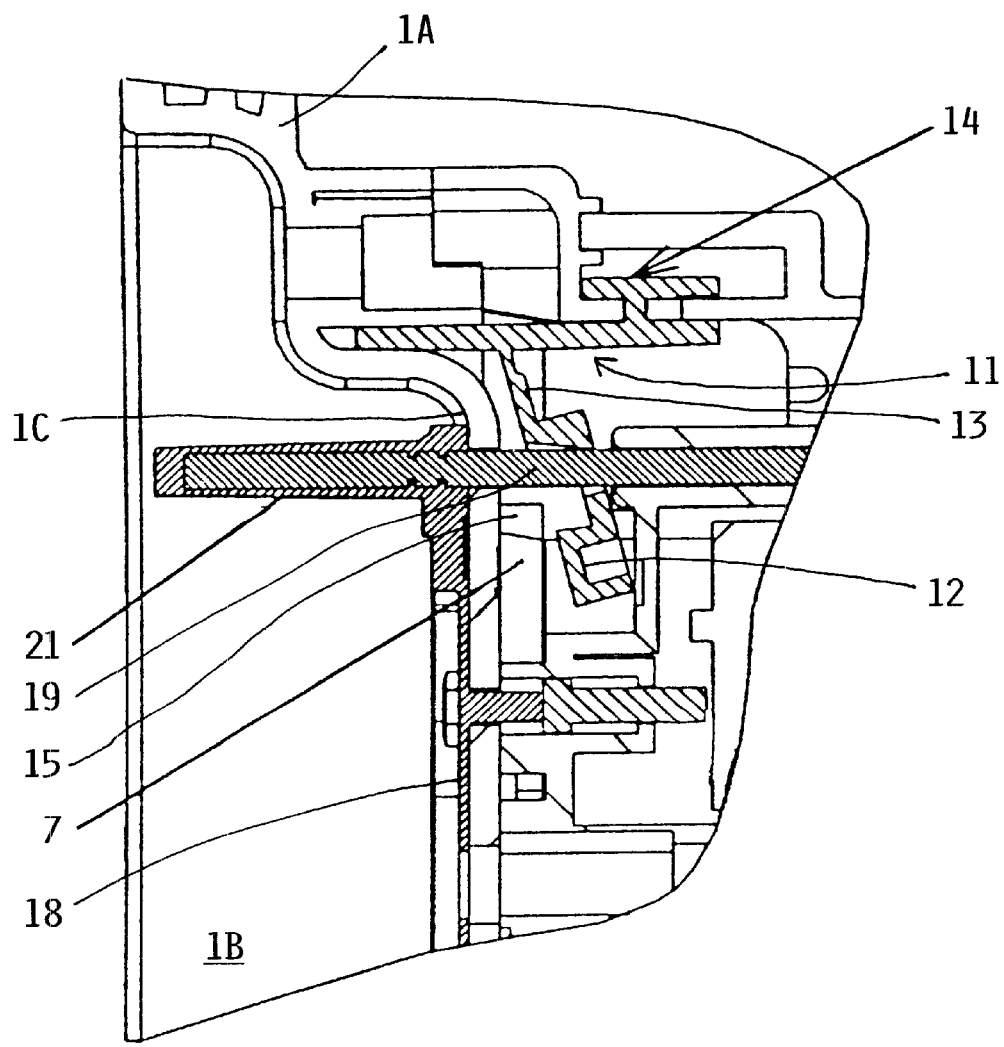
FIG. 4B is an enlarged detail view of the detail portion IVB of FIG. 4A.

The exploded view of FIGS. 2A and 2B shows further details of the internal components of the electrical outlet 1. Particularly, the outlet 1 is assembled from the main housing block 5, the housing backplate 5A and various internal components 5B and socket contact elements 6A arranged in the housing block 5 and/or between the housing block 5 and the housing backplate 5A, to form a housing component block 4, which is further assembled with the receptacle housing 1A by bolts or screws 25 or the like. The socket contact elements 6A are arranged in respective socket contact recesses 6 in the housing block 5, with respective contact pin insertion paths leading from the contact socket openings 23 respectively to the socket contact elements 6A in the contact recesses 6. Further components such as clamping elements, spring elements, and connector elements may be arranged in the housing in any conventionally known configuration and arrangement. The particular details of the internal components 5B, the socket contact elements 6A, the housing backplate 5A, and even the receptacle housing 1A and the housing block 5 are not especially significant for the present invention. Instead, these components may have any conventionally known configuration and arrangement, as long as they accommodate the special inventive elements and configuration that will be described below.

Further according to the invention, the electrical outlet 1 includes a closure element 7, which may be generally disk-shaped or plate-shaped with one or more sloping surfaces 10 thereon to cause a lateral sliding force when the contact pins of an inserted electrical plug press against these sloping surfaces. In a particular illustrated example embodiment, the closure element 7 includes an elongated guide body 8 and two closure legs or arms 9 arranged laterally and protruding longitudinally from the elongated guide body 8. These closure arms 9 are respectively provided with the sloping surfaces 10, facing outwardly toward the contact socket openings 23 of the receptacle housing 1A, and facing away from the socket contact recesses 6 and contact elements 6A in the electrical outlet 1. The sloping surfaces 10 are spaced apart from one another by the same spacing distance as the two contact socket openings 23, which corresponds to a typical or standard spacing distance between the contact pins of a standard electrical plug.

The elongated guide body 8 is slidingly received, preferably in a groove, in the housing block 5, to be slidable in a direction substantially perpendicular to the insertion axis A of the electrical outlet 1 in at least one sliding direction. The phrase "substantially perpendicular" means within an ordinary range of manufacturing tolerance and variance about a true perpendicular arrangement e.g. within +/− 5° from true perpendicular. A similar understanding applies to the phrase "substantially parallel".

The closure element 7 is usually urged into a closed position, for example being biased into the closed position by a spring 7A, and is slidably movable to an open position, in which the sloping surfaces 10 and the closure arms 9 have been slidingly displaced away from the respective insertion paths extending from the contact socket openings 23 to the socket contact recesses 6, to allow the contact pins of an electrical plug to be inserted thereinto.

Further according to the invention, the electrical outlet 1 additionally includes a latching element 11 comprising a latching pawl 12, that is movable in a direction substantially parallel to the insertion axis A defined by the direction of insertion of the electrical plug into the outlet 1. The latching pawl 12 is ordinarily in a latching position in which it engages a catch structure, namely a catch element or catch recess 15 of the closure element 7, for example preferably a catch recess 15 provided in the elongated guide body 8. Thereby, the latching pawl 12 prevents the closure element 7 from sliding from the closed position to the open position. The latching element 11 and particularly the latching pawl 12 thereof is urged into the latching position by a compression spring 16.

The latching element 11 preferably further includes a mounting element 14 that is received in a groove that runs parallel to the insertion axis A in the housing block 5 or in the recess housing 1A. The latching pawl 12 is connected to the mounting element 14 by a connector web 13. This mounting element 14 may be slidably received in the corresponding groove in the housing block 5, whereby the entire latching element 11 is slidably displaceable in a direction parallel to the insertion axis A for selectively engaging or disengaging the latching pawl 12 relative to the closure element 7. Alternatively, the mounting element 14 is fixedly secured in the corresponding groove in the housing block 5, e.g. by a tight press fit, while the connector web 13 and/or the latching pawl 12 is elastically flexibly bendable so that the latching pawl 12 may be flexibly deflected in the direction parallel to the insertion axis A for selectively engaging or disengaging the latching pawl 12 relative to the closure element 7.

By the combined effect of the closure element 7 and the latching element 11, further in connection with the respective biasing spring or springs, the closure element 7 closes the contact socket openings 23, until the closure element 7 is slidingly displaced to the open position. But the closure element 7 is latched in its closed position by the latching element 11, so that it cannot be slidingly displaced from the closed position to the open position until the latching pawl 12 is displaced in a direction substantially parallel to the insertion axis A so as to disengage the latching pawl 12 from the closure element 7. This unlatching operation is achieved by an adapter 17 according to the invention.

As shown in the exploded view of FIG. 2A, the adapter 17 includes a planar disk body 18, and an unlatching pin 19 protruding perpendicularly from the planar disk body 18, which may both be made of a molded integral plastic or other electrically insulating material. The adapter 17 may further include a protruding pin or shaft stub 21 that may serve the function of a hand grip and/or an alignment pin for conveniently inserting the adapter 17 into the receptacle recess 1B so that the unlatching pin 19 reaches into the unlatching pin hole 22. In this context, the adapter 17 and particularly the disk body 18 thereof has a shape generally matching the shape of the floor surface 1C of the receptacle recess 1B, so that the disk body 18 lies flatly along the floor surface 1C in its installed position.

When the adapter 17 is installed, i.e. mounted on the electrical outlet 1, the unlatching pin 19 thereof reaches through the unlatching pin hole 22 in the floor surface 1C, so as to reach into the interior of the receptacle housing 1A, and presses against the latching element 11 in a direction substantially parallel to the insertion axis A. Particularly, in the illustrated embodiment, the unlatching pin 19 presses against the connector web 13 or against the latching pawl 12, so as to flexibly bendably deflect the latching pawl 12 against the biasing force of the compression spring 16. Thereby the latching pawl 12 releases the closure element 7 by disengaging from the catch element or recess 15. As a result, the closure element 7 is now free to slide in a direction substantially perpendicular to the insertion axis A. The adapter disk body 18 and/or the unlatching pin 19 are received in the corresponding parts of the electrical outlet with a friction fit, or with detents, so that the unlatching pin is held securely in its inserted position deflecting the latching pawl 12 against the spring bias force of the spring 16.

Thus, once the adapter 17 has been inserted into the electrical outlet 1 as described above, then a conventional electrical plug may be inserted into the electrical outlet 1. Particularly, as the electrical plug is inserted into the receptacle recess 1B, the contact pins of the plug first pass through holes 20 provided in the disk body 18 of the adapter 17 at a proper spacing distance to receive the contact pins. The contact pins proceed further through the contact socket openings 23 provided in the floor surface 1C of the receptacle recess 1B. Then the free forward ends of the contact pins of the electrical plug press against the sloping surfaces 10 of the closure element 7 and thereby exert a pressing force, which is transformed by the sloping surfaces 10 into a laterally directed force component that causes the closure element 7 to slide from the closed position to the open position. Thereafter the contact pins of the electrical plug being inserted proceed further to engage into the socket contact recesses 6 in the housing block 5 so as to establish an electrical connection with the socket contact elements 6A.

When the electrical plug is removed, the closure element 7 slides back to the closed position, e.g. under the influence of the biasing spring 7A. The adapter 17 may be left in place in and on the electrical outlet if the outlet is to remain "unlocked" for further use. Alternatively, the adapter 17 may be removed the electrical outlet is to be locked to prevent further use thereof.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An electrical outlet arrangement including an electrical outlet that comprises:
    a housing having at least two socket openings adapted to receive contact pins of an electrical plug inserted therein extending along an insertion axis;
    electrical contacts arranged in said housing respectively in alignment with said socket openings parallel to said insertion axis;
    a closure element that is slidably arranged in said housing on a plane extending substantially perpendicularly to said insertion axis between said socket openings and said electrical contacts so that said closure element is slidable along said plane between a closed position in which said closure element blocks respective insertion paths extending from said socket openings to said electrical contacts and an open position in which said closure element does not block said insertion paths, wherein said closure element includes at least one sloping surface that is positioned in at least one of said insertion paths facing toward at least one of said socket openings when said closure element is in said closed position, and wherein said closure element further includes a catch structure; and
    a latching element including a latching pawl arranged in said housing, wherein said latching pawl is movable in a direction substantially parallel to said insertion axis between a latched position in which said latching pawl engages said catch structure of said closure element and prevents a sliding displacement of said closure element from said closed position to said open position, and an unlatched position in which said latching pawl is disengaged from said catch structure and does not prevent said sliding displacement of said closure element.

2. The electrical outlet arrangement according to claim 1, wherein said latching element further includes a mounting element that is fixedly secured in said housing and a connector web that connects said latching pawl to said mounting element, and wherein at least one of said connector web and said latching pawl is elastically flexibly deflectable in said direction substantially parallel to said insertion axis to provide said latching pawl being movable in said direction substantially parallel to said insertion axis.

3. The electrical outlet arrangement according to claim 1, wherein said latching element further includes a mounting element that is slidably arranged in a groove in said housing extending substantially parallel to said insertion axis, and a connector web connecting said latching pawl to said mounting element so that said latching element is slidable to provide said latching pawl being movable in said direction substantially parallel to said insertion axis.

4. The electrical outlet arrangement according to claim 1, wherein said electrical outlet further comprises a first compression spring arranged in said housing and bearing against a portion of said latching element so as to spring-bias said latching pawl toward said latched position.

5. The electrical outlet arrangement according to claim 1, wherein said closure element is one single unitary piece that blocks said respective insertion paths of both of said at least two socket openings.

6. The electrical outlet arrangement according to claim 1, wherein said closure element comprises an elongated guide body that is slidingly received in a groove extending substantially perpendicularly to said insertion axis in said housing, and two closure arms extending longitudinally from said guide body respectively at two opposite sides thereof, wherein said catch structure is provided on said guide body, and wherein said at least one sloping surface includes two sloping surfaces that are respectively provided on said two closure arms.

7. The electrical outlet arrangement according to claim 1, wherein said closure element is slidingly received in a groove in said housing extending substantially perpendicularly to said insertion axis, such that said closure element is linearly slidable along said groove.

8. The electrical outlet arrangement according to claim 1, further comprising a second spring arranged in said housing and bearing against said closure element so as to spring-bias said closure element toward said closed position.

9. The electrical outlet arrangement according to claim 1, further including an adapter mounted on said electrical outlet, wherein said adapter comprises an adapter body and an unlatching pin protruding from said adapter body, said housing of said electrical outlet further has an unlatching pin hole therein allowing access to said latching element, and said adapter is arranged with said unlatching pin inserted into said unlatching pin hole and pressing against a portion of said latching element so as to displace said latching pawl from said latched position to said unlatched position and hold said latching pawl in said unlatched position.

10. The electrical outlet arrangement according to claim 9, wherein said latching element further includes a mounting element that is fixedly secured in said housing and a connector web that connects said latching pawl to said mounting element, wherein said connector web is elastically flexibly deflectable in said direction substantially parallel to said insertion axis to provide said latching pawl being movable in said direction substantially parallel to said insertion axis, and wherein a free end of said unlatching pin protruding away from said adapter body bears against said connector web so as to flexibly deflect said connector web and thereby displace said latching pawl in said direction substantially parallel to said insertion axis from said latched position to said unlatched position and hold said latching pawl in said unlatched position.

11. The electrical outlet arrangement according to claim 9, wherein said housing includes an external receptacle floor, said socket openings and said unlatching pin hole are arranged adjacent to one another in said receptacle floor, and respective hole axes of said socket openings and said unlatching pin hole extend parallel to each other and define said insertion axis.

12. The electrical outlet arrangement according to claim 11, wherein said adapter body is arranged at least partially overlapping said receptacle floor and has contact pin holes therein respectively in registration with said socket openings.

13. The electrical outlet arrangement according to claim 12, further including an electrical plug comprising a plug body and at least two electrical contact pins protruding from said plug body, wherein said plug body is arranged against said adapter body with said contact pins respectively inserted through said contact pin holes of said adapter body and said socket openings of said electrical outlet, such that said contact pins have pushed against said at least one sloping surface of said closure element and caused said closure element to slide from said closed position to said open position, and said contact pins extend respectively further along said insertion paths into contact with said electrical contacts of said electrical outlet.

14. The electrical outlet arrangement according to claim 12, wherein said adapter body is a flat planar disk-shaped body, and said unlatching pin protrudes perpendicularly from said disk-shaped body.

15. The electrical outlet arrangement according to claim 14, wherein said housing defines an externally open receptacle recess with a bottom bounded by said receptacle floor, said disk-shaped body is arranged in contact with and extending along said receptacle floor, and said disk-shaped body has a plan shape matching a contour shape of said receptacle floor.

16. The electrical outlet arrangement according to claim 14, wherein said adapter further comprises a pin stub protruding perpendicularly from said disk-shaped body on an opposite side thereof from said unlatching pin.

17. The electrical outlet arrangement according to claim 9, further including an aircraft passenger seat, wherein said electrical outlet is installed in, on or directly adjacent to said passenger seat.

18. The electrical outlet arrangement according to claim 1, wherein said housing includes a receptacle housing that has said at least two socket openings therein and a main housing block that has said electrical contacts arranged therein.

* * * * *

UNITED STATES PATENT AND TRADEMARK OFFICE
CERTIFICATE OF CORRECTION

PATENT NO.      : 6,425,773 B2
DATED           : July 30, 2002
INVENTOR(S)     : Mosebach et al.

It is certified that error appears in the above-identified patent and that said Letters Patent is hereby corrected as shown below:

<u>Title page,</u>
Item [56], References Cited, insert the following:
U.S. PATENT DOCUMENTS
-- 4,867,693*     09/1989   Gizienski et al.

<u>Column 9,</u>
Line 20, after "removed", insert -- if --.

Signed and Sealed this

Third Day of December, 2002

JAMES E. ROGAN
*Director of the United States Patent and Trademark Office*